United States Patent [19]

Heitmann

[11] 4,376,291

[45] Mar. 8, 1983

[54] METHOD OF COMPENSATING TIME FAULTS IN A DIGITAL COLOR TELEVISION SIGNAL

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 279,747

[22] Filed: Jul. 2, 1981

[30] Foreign Application Priority Data

Jul. 12, 1980 [DE] Fed. Rep. of Germany ....... 3026473

[51] Int. Cl.³ ............................................ H04N 9/493
[52] U.S. Cl. .................................... 358/320; 358/327; 360/36.2
[58] Field of Search ......................... 358/13, 320, 327; 360/36.2

[56] References Cited

U.S. PATENT DOCUMENTS

| | | | |
|---|---|---|---|
| 4,018,990 | 4/1977 | Long et al. | 358/320 |
| 4,065,787 | 12/1977 | Owen et al. | 360/36.2 |
| 4,101,939 | 7/1978 | Owen et al. | 360/36.2 |
| 4,133,009 | 1/1979 | Kittler et al. | 360/36.2 |

Primary Examiner—Richard Murray
Attorney, Agent, or Firm—Frishauf, Holtz, Goodman & Woodward

[57] ABSTRACT

The specification describes a method for compensating time faults in a color television signal which is reproduced from an information carrier and converted into digital form. The compensation is achieved in various stages involving a plurality of intermediate memories and clock signals, each stage performing a phase comparison for compensating a particular error in the reproduced signal.

5 Claims, 2 Drawing Figures

METHOD OF COMPENSATING TIME FAULTS IN A DIGITAL COLOR TELEVISION SIGNAL

BACKGROUND OF THE INVENTION

The invention concerns a method of compensating time faults in a colour television signal reproduced from an information carrier and converted into digital form.

An arrangement and method of regenerating a time-base component of an information signal is known from DE-OS No. 25 18 475 in which an analogue-digital converted colour television signal is registered in a memory under the control of a clock signal synchronous with the auxiliary colour-carrier, and is read out from the memory under the control of a clock signal free from time faults. However, this known method has the disadvantage that due to the coupling of the digital scanning signal with the colour-carrier for different colour-carrier frequencies (e.g. NTSC, PAL) the corresponding digital memories must be of differing construction. Furthermore, a displacement of the colour-carrier frequency takes place if the colour television signal is reproduced at a speed different from the recording (slow-motion, freeze-frame, quick-motion). It is the object of the present invention to provide a method for compensating time faults which does not exhibit these disadvantages.

SUMMARY OF THE INVENTION

According to the invention there is provided a method of compensating time faults in a colour television signal reproduced from an information carrier and converted into digital form, comprising producing a first clock signal whose phase position is determined by horizontal frequency synchronising signals in the colour television signals reproduced from the information carrier and whose frequency is adjustable by a first control signal, the first clock signal being used for both analogue/digital conversion of the reproduced colour television signal and for reading the resultant digital signal into a first memory, reading out the digital signal from the first memory under the control of a second clock signal whose frequency is an integral multiple of a horizontal frequency reference signal, measuring the difference between the line period of the digital signal read out from the first memory and the line period defined by the reference signal for deriving the said first control signal, determining the phase difference between the horizontal frequency pulses of the reference signal and the horizontal frequency pulses of the digital signal read out from the first memory, reading the digital signal from the first memory into and out of a second memory with a delay corresponding to the phase difference so determined, reading the signals from the second memory into a third memory under the control of the second clock signal, reading the digital signal out of the third memory under the control of a third clock signal obtained from the second clock signal by a controllable phase shift, effecting a phase comparison between the colour synchronising signal of the digital signal read out from the third memory and a reference colour synchronising signal, and using the result of the phase comparison to obtain a second control signal which is used for controlling the phase shift of the second clock signal.

The invention has the advantage that the analogue/digital conversion takes place independently of the colour-carrier frequency actually present, that is the frequency of the colour television signals reproduced from the information carrier.

BRIEF DESCRIPTION OF THE DRAWINGS

An embodiment of the invention will now be described by way of example with reference to the accompanying drawings, in which.

DESCRIPTION OF THE PREFERRED EMBODIMENT

Figure 1:
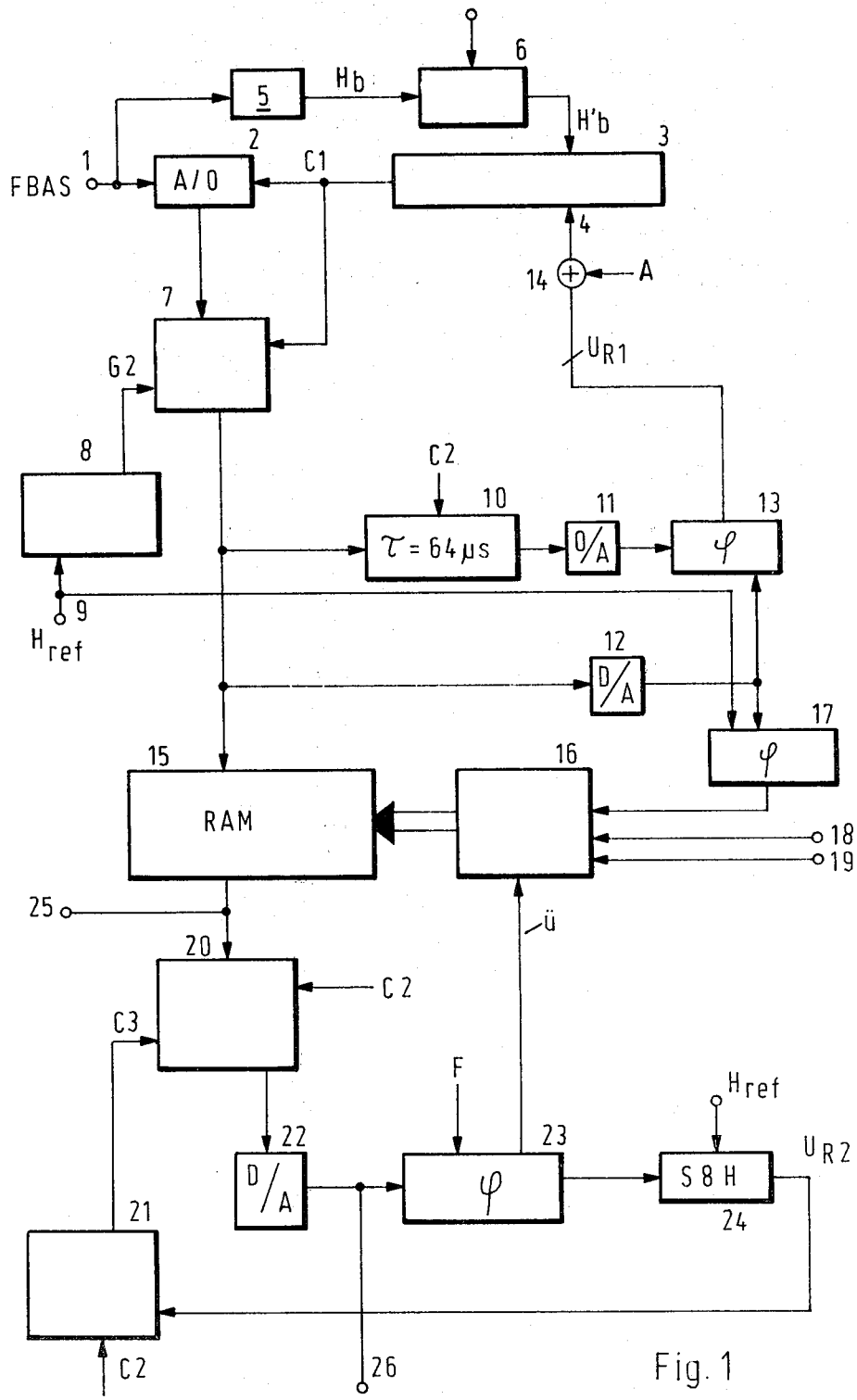
FIG. 1 is a block diagram of a circuit for compensating time faults in a digital colour television signal.

An analogue colour television signal reproduced from a magnetic tape is delivered at 1 to the circuit of FIG. 1, and is converted into a corresponding digital signal in an analogue/digital converter 2. The analogue/digital converter 2 is controlled by a first clock signal $C_1$ which, for example, has a nominal frequency of 20 $MH_z$ and is produced by a start-stop oscillator 3. The oscillator 3 is set into action by horizontal frequency pulses and the frequency of the oscillator is adjustable about the nominal value by means of a control voltage delivered at 4. The horizontal frequency pulses necessary for initiating the action of the start-stop oscillator 3 are derived from the colour television signal at 1 by a separation circuit 5. In the case of reproduction from a video tape apparatus in which a half-picture (field) is recorded over several oblique tracks, there is also provided a selection circuit 6 which is controlled by a switch-over pulse.

The digital output signal of the analogue/digital converter 2 is read into a so-called FIFO (first in-first out) memory 7 under the control of the first clock signal $C_1$, and is read out from the memory 7 under the control of a second clock signal $C_2$. This second clock signal is generated by a quartz oscillator 8 and has a frequency which is an integral multiple of a horizontal frequency reference signal delivered at 9. The frequency of the clock signal $C_2$ is equal to the nominal frequency of the clock signal $C_1$, in the present case 20 $MH_z$ which is 32,000 times the frequency of the reference signal at 9 for a colour television signal according to the 625 line system.

The digital signal read out from the memory 7 is delayed in a digital delay line 10 for the duration of one standard line period (64 $\mu$s for the 625 line system), the delay line 10 being controlled by the clock signal $C_2$. Both the delayed and the undelayed digital signals are converted into corresponding analogue signals by digital/analogue converters 11 and 12 respectively, and are delivered to a colour-carrier comparison circuit 13. By this means one obtains a control voltage $U_{R1}$ which corresponds to the difference between the line period of the digital signal read out from the memory 7 and the standard line period defined by the reference signal at 9. This first control voltage adjusts the frequency of the start-stop oscillator 3 in such manner that the number of pulses of the clock signal $C_1$ per reproduced line period is equal to the number of pulses of the clock signal $C_2$ per standard line period as defined by the reference signal at 9. In the delivery path of the first control voltage from the colour-carrier comparison circuit 13 to the control input 4 of the start-stop oscillator 3, there is provided an adder circuit 14 which is supplied with a signal A corresponding to other expected errors which arise, for example, after the switchover from one recorded track to another.

The digital signal read out from the memory 7 is substantially free from speed errors, by which are meant faults which arise from a time compression or expansion of the reproduced lines as a result of speed variations in the magnetic tape apparatus. In the case of video tape apparatus in which a half-picture is recorded in each track, the digital signal read from the memory 7 is also free from those timing faults which are caused by the switch-over from one track to another. The digital signal read out from the memory 7 is passed to a random access memory 15. The capacity of this memory 15 will generally amount to two or three lines. In order to control the addresses under which the digital signal is read into and out of the memory 15 an address control 16 is provided. In a phase-comparison circuit 17 the horizontal frequency pulses present in the digital signal read from the memory 7 and the pulses of the horizontal frequency reference signal $H_{ref}$ are compared as to phase position and the phase difference determined. In the present embodiment this phase measurement is effected in the phase-comparison circuit 17 by conventional analogue techniques, since the signal read from the memory 7 was converted into analogue form in the D/A converter 12. However, comparison circuits operating purely digitally could alternatively be used.

In the address control 16, the phase difference thus determined is converted into a corresponding address difference so that the digital signal read out from the memory 15 has its horizontal frequency pulses in phase with the pulses of the horizontal reference frequency signal at 9. The memory 15 thus effectively constitutes a digital delay line with variable delay controlled by the phase difference between the horizontal frequency pulses from the digital signal and reference signal respectively. Moreover, correction signals are also supplied to the address control 16. Thus at 18 there is introduced a signal which is derived, in well known manner, when signal drop-out exists in the magnetic tape apparatus and therefore no signals are available. In this case, read out from the memory 15 is controlled in such a way that one of the preceding line stored in the memory is repeatedly read out until the drop-out condition is ended. In systems in which the colour-carrier switching phase is repeated only after several partial pictures (e.g. eight partial pictures in a PAL signal), strictly speaking it is essential for a magnetic tape apparatus to be correspondingly synchronized. With the present embodiment however, in the event of a faulty synchronisation it is possible with the aid of a correction signal which is delivered at 19 to displace read out of the digital signal from the memory 15 by one line for example so that the necessary phase position of the colour-carrier is established again.

The digital signal read out from memory 15 is delivered to a second FIFO memory 20 and to a digital signal output 25. The digital signal from memory 15, previously corrected for speed errors, is now also correct in its phase position with respect to the horizontal frequency reference signal at 9. It now remains to correct the colour-carrier phase position and for this purpose the digital signal is read into the second FIFO memory 20 under the control of the clock signal $C_2$, and read out from the memory 20 under the control of a clock signal $C_3$ which is derived from the clock signal $C_2$ by means of a controllable phase shifter 21.

The digital signal read out from the memory 20 is delivered via a digital/analogue converter 22 to a phase-comparison circuit 23 in which the colour synchronising signal present in the analogue output signal of the D/A converter 22 is compared in phase with a reference colour synchronising signal F. The result of this comparison is kept constant for the duration of one line by a scanning and holding circuit 24 provided with the horizontal frequency reference signal $H_{ref}$. The output voltage $U_{R2}$ of the scanning and holding circuit 24 passes to a control input of the phase shifter 21. This leads to a phase displacement of the clock signal $C_3$ whereby the digital signal from the memory 20 is read out in such manner that the phase difference of the colour synchronising signals is reduced or eliminated. However, if the phase difference exceeds a certain value, then the address control 16 is given an appropriate signal ü with the result that the memory 15 is appropriately controlled for correcting the horizontal frequency phase position. Hence the digital signal which is read from the memory 20 is also corrected with regard to its colour-carrier phase position, and is available in analogue form at the output 26.

Figure 2:
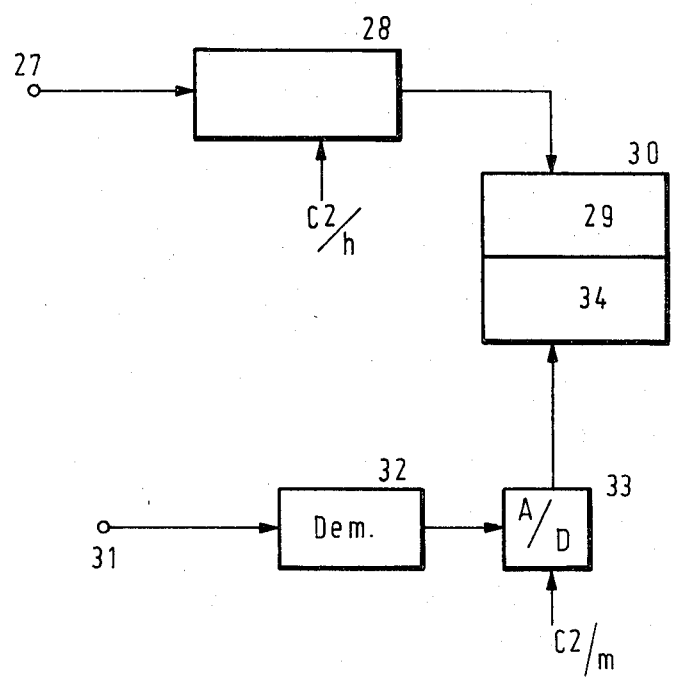
FIG. 2 is a block diagram of a circuit for connecting a digital picture store to the circuit of FIG. 1.

For reproducing still pictures or for slow-motion reproduction, it is known that the colour television signals reproduced from magnetic tape may be stored in a digital picture store. FIG. 2 shows a circuit by which such a picture store 29 may be advantageously connected to the circuit shown in FIG. 1, and is based on the assumption that in the picture store 29 the luminance information and the colour information are stored separately. The digital signal available at 25 in the circuit of FIG. 1 is delivered at 27 to the circuit of FIG. 2, and passes through a digital low-pass filter 28 in order to reduce the scanning rate to that of the luminance component part 29 of the store 30. Filter 28 is necessary because in the circuit of FIG. 1 a very high scanning frequency was chosen for the purpose of compensating for time faults, whereas in the case of the picture store 29 a lower scanning frequency may be used.

From the output 26 in FIG. 1, the analogue signal is delivered at 31 to the circuit of FIG. 2, and passes to a demodulator 32 which separates the colour component from the complete colour television signal. The demodulated signal passes to an A/D converter 33 whose output signal is stored in that part 34 of the store 30 provided for the colour component.

I claim:

1. A method of compensating time faults in a colour television signal reproduced from an information carrier and converted into digital form, comprising producing a first clock signal whose phase position is determined by horizontal frequency synchronising signals in the colour television signals reproduced from the information carrier and whose frequency is adjustable by a first control signal, the first clock signal being used for both analogue/digital conversion of the reproduced colour television signal and for reading the resultant digital signal into a first memory, reading out the digital signal from the first memory under the control of a second clock signal whose frequency is an integral multiple of a horizontal frequency reference signal, measuring the difference between the line period of the digital signal read out from the first memory and the line period defined by the reference signal for deriving the said first control signal, determining the phase difference between the horizontal frequency pulses of the reference signal and the horizontal frequency pulses of the digital signal read out from the first memory, reading the digital signal from the first memory into and out of a second memory with a delay corresponding to the phase difference so determined, reading the signals from the second memory into a third memory under the control of the second clock signal, reading the digital signal out of the third memory under the control of a third clock signal obtained from the second clock signal by a controllable phase shift, effecting a phase comparison between the colour synchronising signal of the digital signal read out from the third memory and a reference colour synchronising signal, and using the result of the phase comparison to obtain a second control signal which is used for controlling the phase shift of the second clock signal.

2. A method in accordance with claim 1 wherein the first control signal is superimposed with a further signal which corresponds to other expected errors.

3. A method in accordance with claim 1 or 2 wherein the second memory is controlled to repeat a line stored therein upon occurrence of signal drop-out.

4. A method in accordance with claim 1 or 2, wherein after low-pass filtering to reduce the scanning frequency the digital signal from the second memory is stored in a digital picture store, and wherein the digital signal from the third memory is passed, after digital/analogue conversion, to a demodulator for deriving a demodulated colour information signal, the demodulated colour information signal, after analogue/digital conversion, also being stored in the digital picture store.

5. A method in accordance with claim 3, wherein after low-pass filtering to reduce the scanning frequency the digital signal from the second memory is stored in a digital picture store, and wherein the digital signal from the third memory is passed, after digital/analogue conversion, to a demodulator for deriving a demodulated color information signal, the demodulated color information signal, after analogue/digital conversion, also being stored in the digital picture store.

* * * * *